United States Patent [19]

Hebert et al.

[11] Patent Number: 4,870,274
[45] Date of Patent: Sep. 26, 1989

[54] LASER SCANNER WITH ROTATING MIRROR AND HOUSING WHICH IS TRANSPARENT TO THE SCANNING RADIATION

[75] Inventors: Raymond T. Hebert, Los Gatos; Paul A. Conrotto, San Jose, both of Calif.

[73] Assignee: Micro Video, Inc., Campbell, Calif.

[21] Appl. No.: 129,063

[22] Filed: Dec. 7, 1987

[51] Int. Cl.⁴ .......................... H01J 5/16; G06K 7/10
[52] U.S. Cl. ...................... 250/236; 350/6.9; 235/467
[58] Field of Search ............... 250/235, 236; 350/6.9; 235/467

[56] References Cited

U.S. PATENT DOCUMENTS

| | | | |
|---|---|---|---|
| 3,885,857 | 5/1975 | Flogaus et al. | 250/235 |
| 3,909,104 | 9/1975 | Menke | 250/236 |
| 3,978,317 | 8/1976 | Yamaguchi et al. | 235/61.11 E |
| 4,064,390 | 12/1977 | Hildebrand et al. | 235/467 |
| 4,606,601 | 8/1986 | Starkweather | 350/6.9 |
| 4,652,732 | 3/1987 | Nickl | 235/467 |
| 4,655,541 | 4/1987 | Yamazaki et al. | 350/3.71 |
| 4,662,707 | 5/1987 | Teach et al. | 350/6.5 |
| 4,699,447 | 10/1987 | Howard | 350/6.9 |

Primary Examiner—Edward P. Westin
Assistant Examiner—William L. Oen
Attorney, Agent, or Firm—Paul Hentzel

[57] ABSTRACT

A scanning has a spinning mirror and an array of peripheral stationary mirrors which generate a scan pattern for reading bar codes. The backscatter from the bar code is collected by the peripheral mirrors and focused by an imaging lens. A housing is provided over the spinning mirror to reduce windage. The drive motor for the spinning mirror is mounted in front of the of the between the peripheral mirrors and the bar code. A backscatter detector is mounted behind the at the focal point of the imaging lens.

32 Claims, 5 Drawing Sheets

LASER SCANNER WITH ROTATING MIRROR AND HOUSING WHICH IS TRANSPARENT TO THE SCANNING RADIATION

TECHNICAL FIELD

This invention relates to bar code laser scanners, and more particularly such scanners in which the rotating assembly is enclosed within a housing.

BACKGROUND

Heretofore bar code laser scanners have employed a rotating mirror assembly within an arrangement of stationary peripheral mirrors. The rotating mirror did not have a housing and produced a "windage" load requiring a larger drive motor. The motor was typically mounted behind the peripheral mirrors along the axis of rotation.

SUMMARY

It is therefore an object of this invention to provide an improved scanner.

It is another object of this invention to provide a scanner which is smaller and cheaper.

It is a further object of this invention to provide a scanner with a minimum detection region.

It is a further object of this invention to provide a scanner with minimum windage load.

It is a further object of this invention to provide a scanner with improved retro-directivity.

It is a further object of this invention to provide a scanner with improved signal to noise.

It is a further object of this invention to provide a scanner having a drive motor mounted in the front within the ring of peripheral mirrors.

Briefly, these and other objects of the present invention are accomplished by providing a scanning device having a radiation source for reading coded information and detecting the backscatter therefrom. The scanner has a rotating assembly with a drive motor mounted at one end thereof and a central mirror means on the rotating assembly for reflecting the radiation beam generally radially outward from the axis of rotation as the rotating assembly spins. A housing on the rotating assembly is positioned around the central mirror. An array of stationary peripheral mirrors positioned around the rotating assembly reflect the radiation beam from the central mirror to the reading zone. Each peripheral mirror is oriented for reflecting the radiation beam along a single scan line which collectively forms a predetermined scan pattern. The peripheral mirrors collect the backscatter from the coded information in the reading area for reflection to the central mirror. A backscatter detector and related imaging lens is mounted under the central mirror at the other end of the of the scanning device for detecting the backscatter.

BRIEF DESCRIPTION OF THE DRAWING

Further objects and advantages of the scanning device and the operation of housing will become apparent from the following detailed description and drawing in which.

Figure 1:
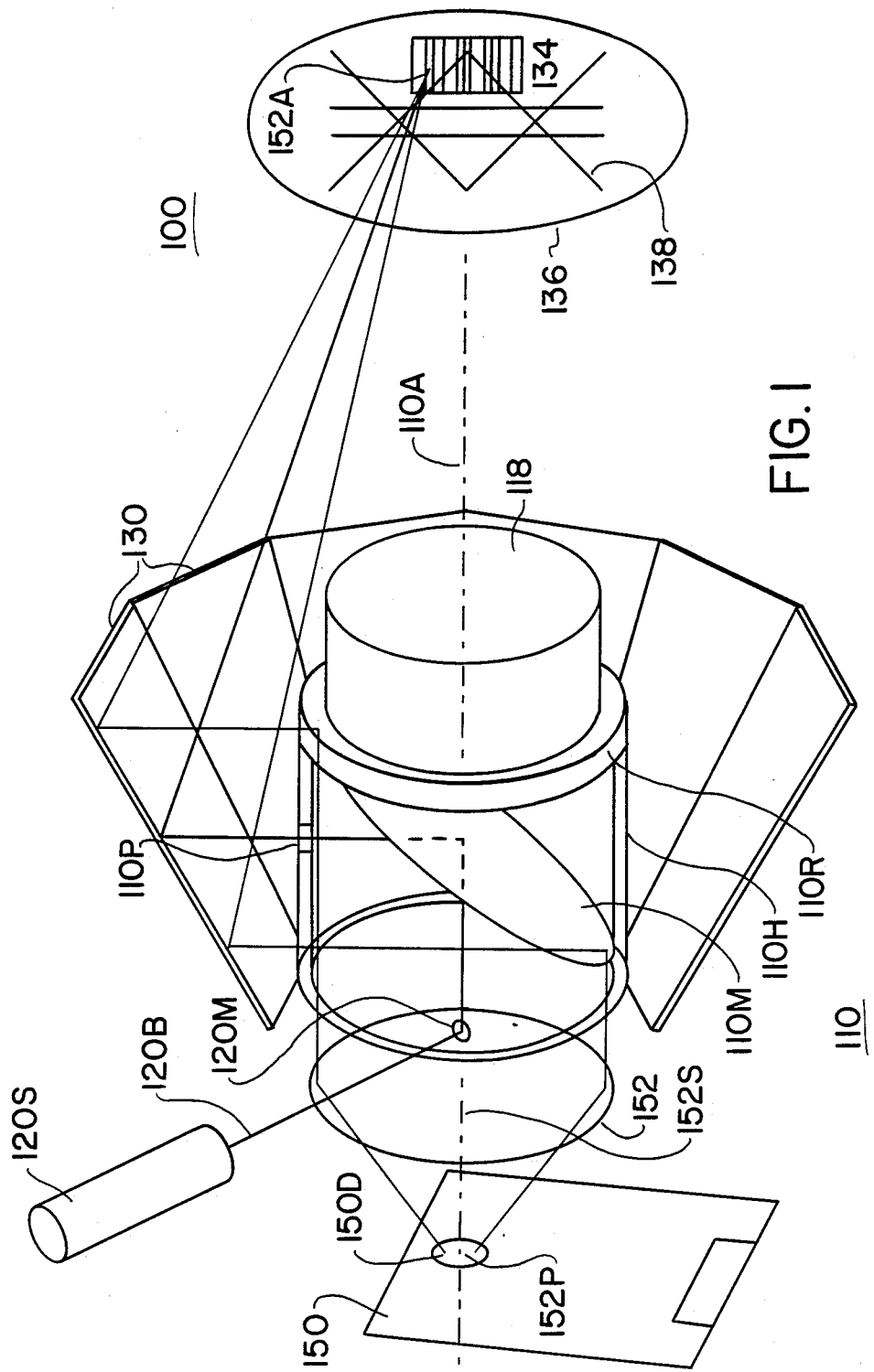
FIG. 1 is a perspective partially broken away view of the scanner showing the mirror array, the rotating housing and the detector circuit board.

Each element of the invention is designated by a three digit reference numeral. The first digit indicates the Figure in which that element is first disclosed or described. The second and third digits indicate like features and structural elements throughout the Figures. Some reference numerals are followed by a letter which indicates a subportion or feature of that element.

GENERAL EMBODIMENT (FIG. 1)

Scanning device 100 employs a rotating assembly 110 formed by the rotor 110R of drive motor 118, central rotating mirror 110M and rotating envelope or housing 110H surrounding the rotating mirror. A scanning beam 120B from a suitable radiation source such as a diode laser or a gas laser 120S is distributed radially from the rotating mirror to a ring or array of peripheral stationary mirrors 130. A beam aperture or port 110P is provided in the housing to pass the beam from the rotating mirror to the peripheral array without interference.

The mirrors of the array reflect the beam onto coded material such as bar code 134 within reading zone 136 to form the scan lines of scan pattern 138. Each mirror creates a single scan line which is determined by the unique tilt of that mirror. The reflected radiation or backscatter generated by the scanning beam hitting the coded information is collected by the peripheral array and reflected off the rotating mirror onto backscatter detector 150D. A circuit board 150 contains the detector and related circuitry for processing the low level backscatter signal.

Figure 2:
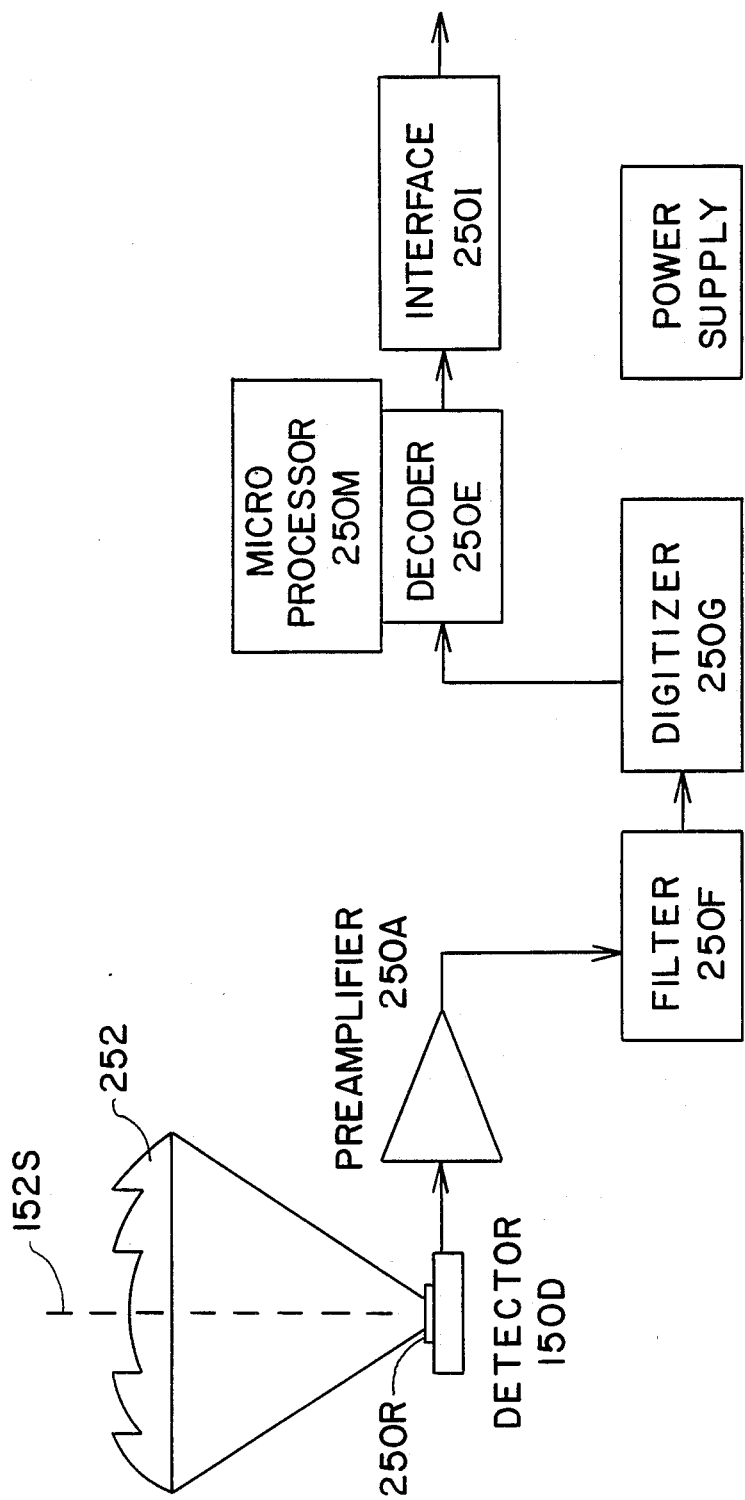
FIG. 2 is a block diagram of the processing circuit on the circuit board of FIG. 1.

A suitable optical imaging device such as lens 152 may be employed to focus the backscatter onto detector 150D. The lens is preferable a plano-aspheric lens (see lens 252 in FIG. 2). The plano side has a short focal distance and faces detector 150D with image focal point 152P at the center of the detection region 250R. The aspheric side faces toward the rotating mirror and has a long focal distance extending from the lens to scanning focal point 152A in the focal plane at reading zone 136. The long focal distance includes the folded path between the rotating mirror and the peripheral mirror. The aspheric side of lens 252 has three concentric sections for reducing the thickness of the lens at the center.

Each mirror of the peripheral array 130 collects the backscatter only from within a specific solid angle of backscatter collection associated with that mirror. Each solid angle of collection forms an expanding pyramid or cone-like volume extending from an apex at scanning focal point 152A to lens 152 which forms the base of each cone. The apex follows the scanning beam impact point as each scan line is traced. The beam impact point is the point source of backscatter light which is always located at the apex of the collection cone. The collection cones are folded by the mirror optics.

Backscattered light is collected from each cone during a time segment of every cycle of the rotating mirror. During that time segment, the rotating mirror directs the scanning beam across the peripheral mirror, and the scan line created by that mirror is formed in the reading zone. Only the creating mirror collects backscatter for that scan line, and the collection occurs only during the time segment in which the scan line is created. Backscatter reflected outside each specific collection cone is lost and does not contribute to the signal generated by detector 150D.

Collectively the collection cones form a ring of cones with an central void or "free space" created by the optical fold. Drive motor 118 is located within the central void. The motor is small and does not interfere with the collection cones.

The axis of symmetry 152S of lens 152 is central to each cone in turn during the scanning time segment for that cone. Further, the symmetry axis 152S is identical to the scanning beam. Small stationary mirror 120M mounted just above the lens reflects the scanning beam onto the axis of symmetry 152S. The beam and the axis of symmetry remain identical throughout the remainder of each collection cone. The resulting optical retro-directivity (beam transmission path identical to lens collection path) minimizes the size of the bar code image on the detector. A smaller detection region is required resulting in lower collection noise caused by ambient light. The smaller detection region also has less internal capacitance and therefore produce less electrical noise in the collection signal from the detector.

The retro-directive effect is isolated from any imbalance or wobble of the rotating mirror. Both the beam source and the lens are stationary and in a fixed relationship with one another. The axis of rotation 110A of mirror 110M may be coincident with the beam and axis of symmetry 152S.

HOUSING

The housing surrounding the rotating mirror reduces the windage load generated as the mirror spins. The housing permits the air within the housing adjacent to the rotating mirror to spin with the mirror and the housing as a single body. The side windage is reduced to the nominal load created by the outside surface of the housing cylinder. The top of the housing is closed by the drive motor which practically eliminates top windage. The collection lens has a smooth radial surface positioned close to the bottom of the housing to minimize bottom windage. The reduced windage lowers the size requirement of the drive motor, and permits the drive motor to be mounted in the central void between the collection cones.

Preferably the housing is thin to minimize the astigmatism of the image at the detector. The collected backscatter is differentially refracted at the external and internal surfaces of the housing causing an astigmatized oval image at detector 150D rather than a true round image. The ends of the oval may fall outside the round detection region of detector 150D causing a loss of backscatter signal. This astigmatism is more noticeable near the edges of the housing where the housing curvature relative to the backscatter is greatest. Backscatter striking the housing at the center has an angle of incidence of 90 degrees, and is not astigmatized. Backscatter striking the housing close to the center is astigmatized only slightly because the curvature is minimal.

The thinner the thickness of the housing, the less noticeable is this astigmatism distortion. However, the housing must be thick enough to remain rigid during the scanning. In addition, a thin housing causes less transmission loss as the backscatter passes through the housing material. In a housing having a diameter of 1.75 inches (or less), the astigmatism is nominal for housing thicknesses of less than about 30 mils.

Beam port 110P passes the scanning beam through the housing without loss in the backscatter signal. Because of the port, the scanning beam is insensitive to scratches and dust collection on the housing. In addition, the beam is not subject to reflection loss and refraction distortion caused by the housing material.

CIRCUIT DIAGRAM (FIG. 2)

Detector 150D is positioned on circuit board 150 at the back of scanner 100 at the image focal point of lens 152. The detected backscatter signal is processed prior to interfacing with the main data processing system. Preamplifier 250P amplifies the low level signals from the detector 150D with minimum injected noise. Filter 250F defines the signal bandwidth providing the least phase distortion of the signal and further minimizes noise. Digitizer 250G reconstructs the leading and trailing edges of the backscatter signal corresponding to step contrast changes at the edges of the bar code. The digitizer compensates for the general fluctuations in the signal level caused by changes in bar code contrast and scanning geometry. Decoder 250E qualifies the data in the backscatter signal recreating the alpha-numerics data coded within the bar code. Microprocessor 250M controls the decoder and coordinates the other blocks in the circuit. Interface 250I presents the decoded information to the data processing system.

COMPENSATING MASSES (FIGS. 3A-D)

The wobble in the rotating assembly may be minimized by balancing the assembly radially and axially. The primary component of imbalance is the mirror which extends asymmetrically across housing from the bottom to the top.

Figure 3C:
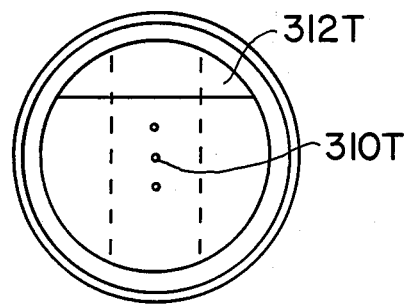
FIG. 3 A–D are the front, side, top, and bottom view of a molded housing with compensating masses for balancing the rotating assembly.
Figures 3A, 3B:
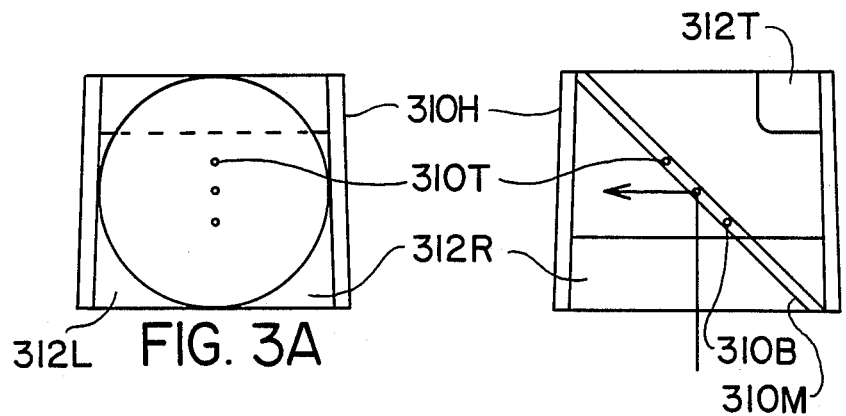

Housing 310H (see FIG. 3A-D) has integral compensating masses for counter balancing mirror 310M. The top half of the mirror has a center of mass 310T which may be balanced by a compensating weight of the same mass placed at the corresponding position on the opposite side of rotation 310A. An effective compensating mass 312T may be molded into the upper part of the housing behind the mirror (see top view FIG. 3C).

Figure 3D:
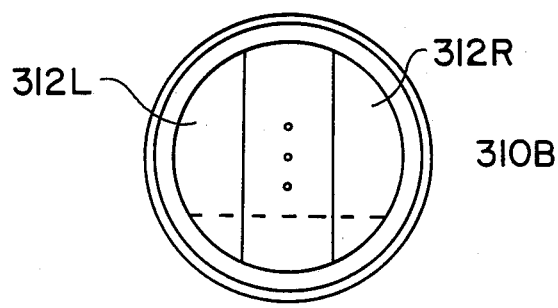

The bottom half of the mirror has a center of mass 310B which may be balanced by a pair of compensating masses, left compensating mass 312L and a right compensating mass 312R (see bottom view FIG. 3D). The compensating weights are molded along the bottom front of the housing to the left and right of the mirror to avoid blocking the backscatter light collected by the array of peripheral mirrors (see front view FIG. 3A). The bottom corners of the housing are created by the cylindrical geometry of the housing and the oval shape of the rotating mirror, and are outside the backscatter collection cone.

Housing 310H is slightly tapered to facilitate removal from the mold during the molding process. Preferably the taper is from top to bottom creating a larger cross-section at the bottom of the housing to allow more room for compensating masses 312L and 312R. Forming the compensating masses on the inside of the housing doe snot disturb the low windage profile of the exterior surface of the housing.

PARABOLIC CENTRAL MIRROR (FIG. 4)

Figure 4:
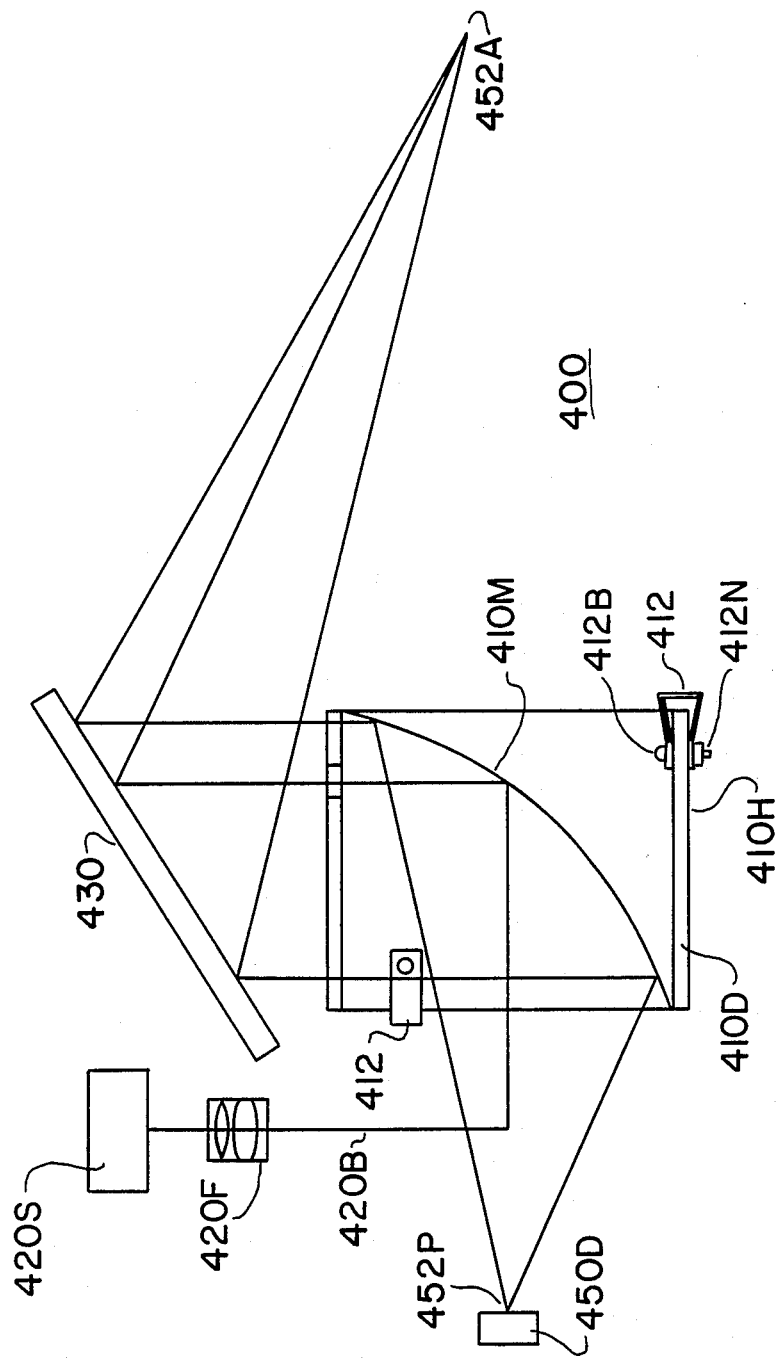
FIG. 4 is a partial side view of a scanner with a parabolic rotating mirror.
Figure 5:
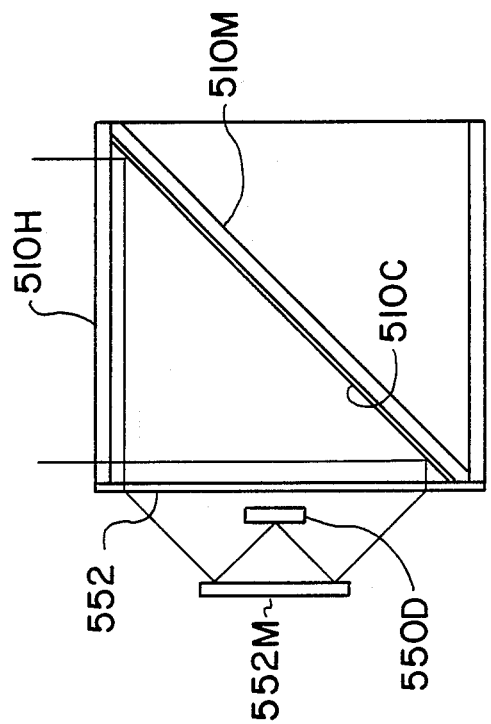
FIG. 5 is a partial side view of a scanner with a frenal lens and folded optics.

Parabolic central mirror 410M in scanning device 400 (see FIG. 4) provides both the reflection function and imaging function of the rotating mirror and lens of scanning device 100 of FIG. 1. Preferably the section for mirror 410M is selected to cause radiation beam 420B from diode laser 420S to be reflected at a right angle toward the peripheral mirror 430. The right angle reflection minimizes the height of the scanning device. The curvature of the parabolic mirror causes the diverging backscatter from beam impact point 452A to converge at point 452P on detector 450D. A suitable beam forming optical device such as lens pair 420F provided a slight convergence to beam 420B which defines a diffraction limited spot at beam impact point 452A. Compensation weights 412 are clip-on type, and are secured to housing 410H by a suitable fastening means such as nut 412N and bolt 412B.

Housing 410H may function as a filter for minimizing ambient noise light from the backscatter collection light. By including a properly selected dye 410D in a film over the housing or within the plastic of the housing, all light is attenuated except for a bandpass at the frequency of the radiation source. A red dye would be used for a the red emission from a helium-neon gas laser, and an infrared dye would be used for the infrared emission from a laser diode.

ROTATING LENS EMBODIMENT (FIG. 5)

The imaging device may be mounted directly onto the rotating assembly. Frenal lens 552 is positioned along the bottom of housing 510H for imaging the backscatter onto detector 550D and for closing the bottom of the housing. A folded optical path is provided for the frenal lens by mirror 552M to reduce the height of the scanning device. Detector 550D may be placed closer to the lens.

A suiable absorbing coating, such as dielectric coating 510C may be formed on rotating mirror 510M to attenuate background light collected along with the backscatter light. Housing 510H does not have a beam port.

SPECIFIC EMBODIMENT

The following particulars of the scanning device are given as an illustrative example of thereof. In this example:

The drive motor is 0.6 watt brushless dc motor with an rpm of 3600. The housing is a right cylinder having a height of 1.75 inches and a diameter of 1.75 inches. The housing material is 10 mil acrylic plastic with a quarter inch beam port. The lens is a segmented plano-aspheric lens 1.75 inches in diameter with a detection focal distance of about 0.7 inches and a scanning focal distance of about 12 inches. The central mirror is a dielectric coated oval mirror 1.75 inches by 2.5 inches positioned at a 45 degree angle within the housing.

The dimensions and material given above are not intended as defining the limitations of the invention. Numerous other dimensions and configurations are possible.

INDUSTRIAL APPLICABILITY

It will be apparent to those skilled in the art that the objects of this invention have been achieved as described hereinbefore by providing a low windage housing around the rotating central mirror, and positioning the drive motor in front of the scanning device between the coded material and the rotating mirror. The ready alignment of the beam and the lens axis in the region behind the scanning device minimizes the size of the image at the detector.

CONCLUSION

Clearly various changes may be made in the structure and embodiments shown herein without departing from the concept of the invention. Further, features of the embodiments shown in the various Figures may be employed with the embodiments of the other Figures.

Therefore, the scope of the invention is to be determined by the terminology of the following claims and the legal equivalents thereof.

---

(1) Scanning
    Radiation Source
    Rotating Assembly
    Axis of Rotation
    Drive Means
    Rotating Mirror
    Housing Means
    Peripheral Mirror Array
    Detector
    Imaging Means
(2) Housing Mns Compensating Masses
(3) Clip on
(4) Molded on
(5) Three Comp Masses
(6) Housing Cylindrical
(7) Housing Tapered
(8) Housing Beam Port
(9) housing Thickness - Nominal Astigmatism
\* \*\* (10) Less Than 30 Mils
\* \*\* (11) About 10 Mils
(12) Housing Scanning End Closed
(13) Housing Detector End Closed
(14) Filter Bandpass at Beam
(15) Dye in Housing
(16) Film Dye
(17) Aspheric Lens
(18) Concentric Sections
(19) Frenal
(20) Lens Axis = Beam
(21) Lens Axis = Rotation Axis
(22) Parabolic Mirror
(23) Collection Cones
(24) Drive between BS Cones
(25) Laser
(26) Gas
(27) Diode
(28) Red wavelength
(29) Preamplifier Means
(30) Filter Means
(31) Digitizer Means
(32) Decoder Means

---

We claim as our invention:

1. A scanning device having a scanning end and a detection end, for providing a predetermined scan pattern over coded information contained within a reading zone at the scanning end, and detecting the backscatter therefrom at the detection end, comprising:
    a radiation source means mounted generally at the detection end of the scanning device for providing a scanning beam of radiation;
    a rotating assembly having an axis of rotation;
    a drive means mounted at the scanning end of the scanning device for spinning the rotating assembly;
    central mirror means on the rotating assembly for reflecting the scanning beam from the detection end of the scanning device generally radially outward from the axis of rotation as the rotating assembly spins;
    windage housing means which is transparent to the scanning beam radiation and positioned on the rotating assembly to enclose the central mirror means for reducing the windage load thereof as the central mirror means and the windage housing means spin together on the rotating assembly;

array of peripheral mirror means positioned around the rotating assembly for reflecting the scanning beam from the central mirror means to the reading zone at the scanning end of the scanning device, each peripheral mirror means oriented for reflecting the scanning beam along a single scan line which collectively forms the predetermined scan pattern, and for collecting the backscatter from the coded information in the reading area for reflection through the windage housing means to the central mirror means;

backscatter detector means mounted at the detection end of the for providing an output signal in response to the backscatter reflected thereto by the central mirror means; and imaging means for focusing the backscatter from the central mirror means onto the detector means.

2. The scanning device of claim 1 wherein the windage housing means has compensating masses for axially and radially balancing the rotating assembly.

3. The scanning device of claim 2 wherein the compensating masses are removably secured to the windage housing means.

4. The scanning device of claim 2 wherein the compensating masses are molded into the windage housing means.

5. The scanning device of claim 2 wherein a single mass is positioned on the windage housing means near the scanning end of the scanning device, and a pair of opposed masses are located on the windage housing means near the detection end of the scanning end.

6. The scanning device of claim 1 wherein the windage housing means is cylindrical.

7. The scanning device of claim 1 wherein the windage housing means is a tapered cylinder.

8. The scanning device of claim 1 wherein the windage housing means has a port means for passing the scanning beam from the central mirror means on the rotating assembly to the array of peripheral mirror means.

9. The scanning device of claim 1 wherein the windage housing means has a thickness which is sufficiently thin so as to produce nominal astigmatism.

10. The scanning device of claim 9 wherein the windage housing means has a thickness of less than about 30 mils.

11. The scanning device of claim 9 wherein the windage housing means has a thickness of about 10 mils.

12. The scanning device of claim 1 wherein the windage housing means is closed by the drive means near the scanning end thereof.

13. The scanning device of claim 1 wherein the windage housing means is closed near the detection end thereof.

14. The scanning device of claim 1 further comprising a filter means for attenuating background light.

15. The scanning device of claim 14 wherein the filter means is a dye in the material of the windage housing means.

16. The scanning device of claim 14 wherein the filter means is a film over the central mirror means.

17. The scanning device of claim 1 wherein the imaging means is an aspherical lens for establishing a short focal distance to the detector means.

18. The scanning device of claim 17 wherein the lens has a plurality of concentric sections for reducing the thickness thereof.

19. The scanning device of claim 17 wherein the lens is a frenal lens.

20. The scanning device of claim 17 wherein the axis of symmetry of the lens is coincident with the scanning beam.

21. The scanning device of claim 20 wherein the axis of symmetry of the lens is also coincident with the axis of rotation of the rotating assembly.

22. The scanning device of claim 1 wherein the central mirror means is a parabolic mirror and the imagine means is formed by the parabolic surface.

23. The scanning device of claim 1 wherein the backscatter is collected within a collection cone for each mirror of the peripheral mirror means array, which collection cone has an apex at the impact point of the scanning beam on the coded material and extends to that mirror of the peripheral array and to the central mirror on the rotating assembly and to the imaging means which forms the base of the collection cone.

24. The scanning device of claim 23 wherein the apex ends of the collection cones form a ring of cones with a central void, and the drive means is positioned in the central void.

25. The scanning device of claim 1 wherein the radiation source means for providing the scanning beam is a laser means.

26. The scanning device of claim 25 wherein the laser means for providing the scanning beam is a gas laser.

27. The scanning device of claim 25 wherein the laser means for providing the scanning beam is a diode laser.

28. The scanning device of claim 25 wherein the laser means for providing the scanning beam emits red light.

29. The scanning device of claim 1 further comprising a preamplifier means for amplifying the output signal from the detector means.

30. The scanning device of claim 1 further comprising a filter means for determining the bandwidth of the output signal from the detector means.

31. The scanning device of claim 1 further comprising a digitizer means for enhancing the leading and trailing edges of the signal from the detector means.

32. The scanning device of claim 1 further comprising a decoder means for decoding the coded information in the signal from the detector means.

* * * * *